3,040,091
PROCESS FOR SYNTHESIS OF STEROIDS AND COMPOUNDS THEREOF

Frank L. Weisenborn, Middlebush, N.J., assignor to Olin Mathieson Chemical Corporation, New York, N.Y., a corporation of Virginia
No Drawing. Filed Mar. 15, 1961, Ser. No. 95,824
13 Claims. (Cl. 260—488)

This invention relates to a process for the synthesis of steroids and to new compounds obtained in the process. More particularly, the invention relates to the production of steroids of the formula (I)

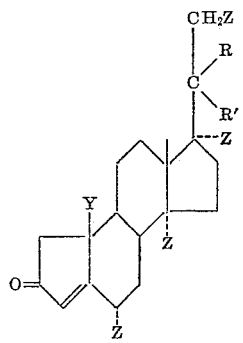

wherein R represents hydrogen, R' represents β-hydroxy or β-acyloxy or R and R' together represent keto, Y represents hydrogen or methyl and Z represents hydrogen or methyl, not more than one Z being methyl.

Essentially the invention provides a new route to A-norprogesterones and especially A-norprogesterone itself.

Preferred are compounds of Formula I wherein Y represents methyl and each Z represents hydrogen. Examples of steroids of Formula I, which may be produced by the process of this invention include A-norprogesterone, A-nor-19-norprogesterone, A-nor-6α-methylprogesterone, A-nor-14α-methylprogesterone, A-nor-17α-methylprogesterone, A-nor-21-methylprogesterone, the corresponding 20β-hydroxy derivatives, such as A-nor-Δ³-pregnene-20β-ol-2-one, and 20β-esters thereof, particularly the esters with hydrocarbon carboxylic acids of less than ten carbon atoms, e.g. the lower alkanoic acids such as acetic and propionic acids, which are preferred, monocyclic aromatic carboxylic acids, monocyclic aralkanoic acids, lower alkenoic acids, cycloalkane carboxylic acids and cycloalkene carboxylic acids.

In the overall synthesis, a compound of the formula (II)

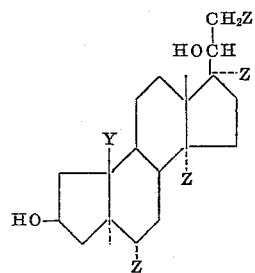

is oxidized, e.g. with chromic oxide in acetone or an aluminum alkoxide such as aluminumisopropoxide in cyclohexanone, to obtain a compound of the formula (III)

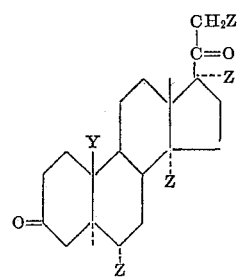

The product of Formula III is next treated with an oxidizing agent such as chromium oxide or potassium permanganate in glacial acetic acid to obtain a compound of the formula (IV)

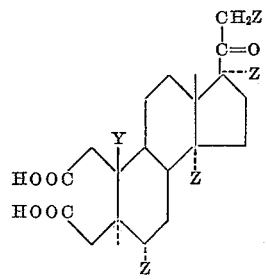

The compound of Formula IV is in turn reduced, e.g. with an alkali metal hydride such as sodium borohydride, lithium borohydride, or the like to obtain a product of the formula (V)

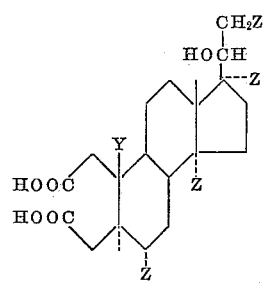

An A ring is then formed in the hydroxy diacid of Formula V by cyclizing and decarboxylating with an acid anhydride e.g. a fatty acid anhydride such as acetic anhydride, preferably by first removing excess anhydride and then heating, e.g. up to a temperature of 175–250°. This produces a compound of the formula (VI)

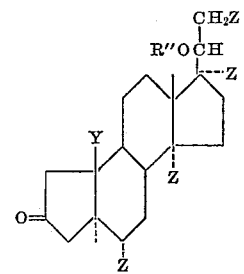

wherein R″ represents the acyl radical of the fatty acid anhydride.

The compound of Formula VI may be treated directly with an acylating agent such as an ester of a lower alkenol, e.g. isopropenyl acetate, or with an alkylating agent such as a lower alkyl orthoformate, e.g. ethyl orthoformate to obtain a compound of the formula
(VII)

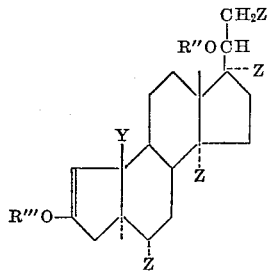

wherein R″ and R‴ represent the same acyl radical as in Formula VI or R‴ represents lower alkyl.

Alternatively, the compound of Formula VII may first be hydrolyzed and then treated with the acylating or alkylating agent. If an alkylating agent such as ethyl orthoformate is used after hydrolysis, then R″ represents hydrogen.

The next step of the comprehensive process involves the halogenation of the compound of Formula VII with a halogen, preferably chlorine or bromine or an N-haloamide or imide of a carboxylic acid, e.g. N-bromoacetamide (or N-bromoamide of other lower fatty acids), N-bromosuccinimide, dibromodimethylhydantoin and the like, preferably in the presence of perchloric acid or other relatively strong acid such as p-toluenesulfonic acid or trichloracetic acid in an inert organic solvent such as dioxane to obtain a compound of the formula
(VIII)

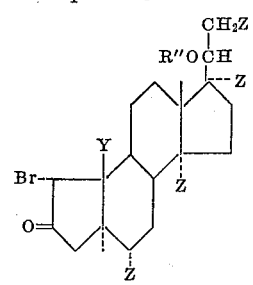

Treatment of this product with an alkali metal lower alkoxide such as potassium t-butoxide yields a compound of the formula
(IX)

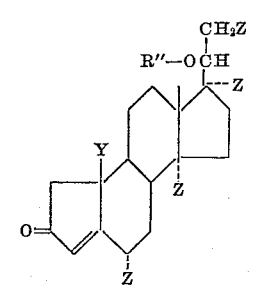

Saponification with a basic agent such as an alkali metal or alkaline earth metal hydroxide yields the 20β-ol
(X)

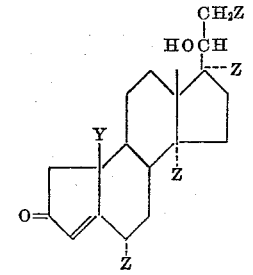

which may be converted to the ketone of Formula I with an oxidizing agent such as chromic acid in acetone or acetic acid or an aluminum alkoxide and the like.

The symbols in all the foregoing formulas have the same significance which is described in connection with Formula I above.

Starting materials of Formula II may be derived, for example, by catalytically hydrogenating a compound of the formula
(XI)

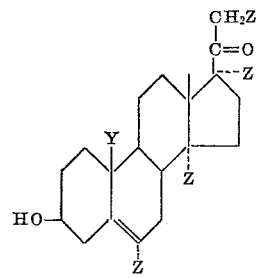

or
(XII)

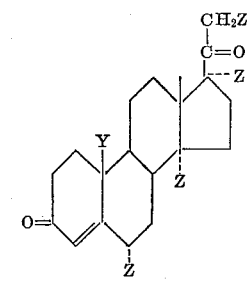

with a noble metal catalyst such as platinum or platinum oxide, preferably in an inert organic solvent such as ethyl acetate, ether, alcohol and the like or by reducing a compound of Formula XII by means of liquid ammonia and a metal such as sodium or lithium. Such starting materials include, for example, progesterone, pregnenolone, 19-norprogesterone, 6α-methylprogesterone, 17α-methylprogesterone, etc.

The compounds of Formula I are physiologically active steroids which are useful as androgen antagonists, for example in cases of hyperandrogenic acne due to excess androgen such as testosterone. They may be administered topically or systemically, e.g. subcutaneously, by incorporation the compound in conventional dosage forms such as ointments, creams or injectables for such purposes.

The following examples are illustrative of the invention. All temperatures are given in degrees centigrade.

EXAMPLE 1

*Allopregnane-3β,20β-Diol (II)*

15 g. of commercial pregnenolone (I) (Protex) are suspended in 200 ml. of ethyl acetate containing two drops of 72% perchloric acid and hydrogenated over 600 mg. of platinum oxide catalyst on a Parr apparatus. Hydrogenation is complete in one hour with the absorption of two moles of hydrogen. At the end of the hydrogenation, the product partially precipitates. 300 ml. of chloroform are added to effect solution and the catalyst is centrifuged off. Evaporation of the centrifugate gives the colorless crystalline diol (II).

*Allopregnane-3,20-Dione (III)*

The crude diol (II) (obtained from 60 g. of pregnenolone by the procedure described above) is dissolved in 3 l. of reagent grade acetone and treated dropwise with stirring with aqueous chromic acid-sulfuric acid solution (about 150 ml.) until an excess can be detected by the color of the solution. The chromic acid reagent is prepared by dissolving 40 g. of chromic anhydride and 34.8 ml. of concentrated sulfuric acid in enough water to give a total volume of 200 ml. The excess chromic acid is destroyed with 5 ml. of ethanol and the chromic sulfate filtered off. The filtrate is neutralized with ammonia solution and evaporated to dryness. The residue is dissolved in 2 l. of chloroform and the solution is washed with water, dilute hydrochloric acid, 5% sodium bicarbonate solution, water, saturated sodium chloride solution, dried over magnesium sulfate and concentrated to dryness. The residue is recrystallized from methanol-methylene chloride to give 47.5 g. (80%) of dione (III), M.P. 200–202°.

*2,3-Seco-Allopregnane-20-One-2,3-Dicarboxylic Acid (IV)*

11.17 g. of allopregnane-3,20-dione (III) are dissolved in 750 ml. of glacial acetic acid and treated with a solution of 11.0 g. of chromic anhydride in 9 ml. of water. The mixture is heated at 60° for 5 hours, concentrated in vacuo to a volume of 100 ml. and then diluted with 350 ml. of water. The resulting precipitate is filtered off and washed free of chromic salts with water. The residue is distributed between 400 ml. of 10% sodium carbonate solution and 400 ml. of ether. The layers are separated and the aqueous phase extracted two more times with 250 ml. portions of ether. The basic aqueous solution is acidified with concentrated hydrochloric acid and extracted three times with 400 ml. portions of ether. The combined ether extracts are washed with water, saturated sodium chloride solution, dried over magnesium sulfate and concentrated to dryness. The residue of crude crystalline keto diacid (IV) weighs 5.61 g. Recrystallization from acetone-hexane gives an initial crop of 3.21 g., M.P. 199–200°, and a purer second crop of 700 mg., M.P. 207–209°. Total yield, 3.91 g. (31%).

EXAMPLE 2

*2,3-Seco-Allopregnane-20β-Ol-2,3-Dicarboxylic Acid (V)*

4.37 g. of the keto diacid (IV) obtained as described above are dissolved in an aqueous solution of sodium hydroxide prepared by diluting 9.6 ml. of 2.5 N sodium hydroxide to 100 ml. with water. To this mixture a solution of 874 mg. of sodium borohydride in 2 ml. of 2.5 N sodium hydroxide and 18 ml. of water is added dropwise with stirring at room temperature. After addition is complete, the solution is stirred an additional 30 minutes and then carefully acidified by dropwise addition of 42 ml. of 2 N hydrochloric acid. The precipitate is filtered off, washed with water, and dried to give 4.19 g. (95%) of hydroxy diacid (V), M.P. 246–256°.

The analytical sample has a melting point of 258–260°, $[\alpha]_D+4°$ (ethanol).

EXAMPLE 3

*A-Norallopregnane-2-One-20β-Ol (VI)*

8.02 g. of the hydroxy diacid (V) obtained as described above are heated under reflux with 32 ml. of acetic anhydride for one hour and the excess acetic anhydride removed in vacuo. The residue is then heated to 200° with stirring to effect decarboxylation. The progress of the decarboxylation is followed by collecting the carbon dioxide in a burst over water. After 2½ hours at 200–210° no further evolution of gas is evident. The residue is dissolved in a mixture of 13 g. of sodium hydroxide, 36 ml. of water and 170 ml. of ethanol and the solution heated under reflux (nitrogen atmosphere) for one hour. The alcohol was removed in vacuo and the precipitated product filtered off, washed with water and dried to give 6.05 g. of crude A-norketone (VI). Recrystallization from ethyl acetate-hexane gives 5.2 g. (77%) of product, M.P. 225–228°.

The analytical sample has a melting point of 234–235°, $[\alpha]_D+139°$ (chloroform).

EXAMPLE 4

*A-Norallo-1-Pregnene-3,20β-Diol-3,20β-Diacetate (VII)*

0.87 g. of the hydroxy ketone (VI) obtained as described above are dissolved in 17 ml. of isopropenyl acetate containing 132 mg. of p-toluenesulfonic acid and the solution heated under reflux allowing the vapor to slowly distill during the course of ten hours. Fresh isopropenyl acetate is added from time to time to compensate for the distillate. The resulting solution is diluted with ether, washed with water, 5% sodium bicarbonate solution, water again, saturated sodium chloride solution, dried over magnesium sulfate and concentrated to dryness leaving 1.03 g. of solid. Crystallization of this crude product from methanol gives 410 mg. of enol acetate in the first crop, M.P. 143–145°. The mother liquor is a mixture of enol acetate and starting material and may be recycled.

The analytical sample prepared by further recrystallization from methanol has a melting point of 157–158.5°, $[\alpha]_D+71°$ (chloroform).

EXAMPLE 5

*A-Norallopregnane-1-Bromo-2-One-20β-Ol 20β-Acetate (VIII)*

144 mg. of the enol-acetate (VII) are dissolved in 12 ml. of dioxane and treated with 4.3 ml. of 1 M perchloric acid and 57.8 mg. of N-bromoacetamide. The mixture is allowed to stand 20 minutes and the excess NBA destroyed with a little aqueous sodium sulfite solution. The solution is then diluted with chloroform, washed twice with water, 5% sodium bicarbonate solution, water, saturated sodium chloride solution, dried over magnesium sulfate and concentrated leaving 159 mg. of crude product. Recrystallization from ethyl acetate-hexane gives 113 mg. (72%) of the bromo derivative (VIII) in the first crop, M.P. 173–174°.

The analytical sample has a melting point of 174–176° $[\alpha]_D+114°$ (chloroform).

EXAMPLE 6

*A-Norallo-3-Pregnene-2-One-20β-Ol 20β-Acetate (IX)*

25 mg. of the bromo ketone (VIII) are dissolved in 0.5 ml. of dry t-butanol and treated with 0.51 ml. of 0.114 mole potassium t-butoxide (0.059 mole) in t-butanol. Potassium bromide precipitates rapidly and after five minutes the solution is acidified with a few drops of dilute hydrochloric acid. The mixture is then diluted with water, extracted three times with ether and the ether extracts washed with water, dried over sodium sulfate and concentrated to dryness leaving 20.6 mg. of crystalline product. Recrystallization from ethyl acetate-hexane gives 18 mg. (90%) of unsaturated ketone (IX), M.P. 172–174°, $[\alpha]_D+25°$ (chloroform), $$\lambda_{max.}^{EtOH}\ 232\ m\mu\ (\epsilon=13{,}350)$$

EXAMPLE 7

*A-Nor-3-Pregnene-2-One-20β-Ol (X)*

2.0 g. of unsaturated ketone (IX) produced as described above are dissolved in a solution of 3 g. sodium hydroxide, 10 ml. of water and 50 ml. of ethanol and the mixture refluxed one hour under nitrogen. The alcohol is removed in vacuo and the remaining aqueous solution containing precipitated product is extracted three times with ether. The combined ether extracts are washed with water, saturated sodium chloride solution, dried over magnesium sulfate and concentrated to dryness. The residue crystallizes from ethyl acetate-hexane to give 1.55 g. (88%) of 20β-ol (X), M.P. 208–210°.

The analytical sample has a melting point of 213–214°, $[\alpha]_D-22°$ (ethanol);

$$\lambda_{max.}^{alc.}\ 234\ m\mu\ (\epsilon=15{,}000)$$

EXAMPLE 8

A-Norprogesterone (XI)

500 mg. of A-Nor-3-pregnene-2-one-20β-ol (X) are dissolved in 50 ml. of reagent grade acetone and treated dropwise with stirring with an aqueous chromic acid sulfuric acid solution (20.0 g. of chromic anhydride, 17.4 ml. of concentrated sulfuric acid diluted to 100 ml. with water) until a brown color can be detected in the mixture. About 0.75 ml. of the chromic acid reagent is used. The excess chromic acid is destroyed by addition of a little ethanol and the chromic sulfate filtered off and washed with acetone. A few drops of ammonia solution are added to the filtrate to neutralize any excess sulfuric acid and the acetone is removed in vacuo. The residue is recrystallized from ethyl acetate-hexane to give 450 mg. (90%) of A-norprogesterone, M.P. 148–150°.

The analytical sample has a melting point of 150–151°, $[\alpha]_D + 71°$ (chloroform), $$\lambda_{max.}^{EtOH}\ 233\ m\mu\ (\epsilon = 15,800)$$

The invention may be variously otherwise embodied within the scope of the appended claims.

What is claimed is:

1. A process for the production of compounds of the formula

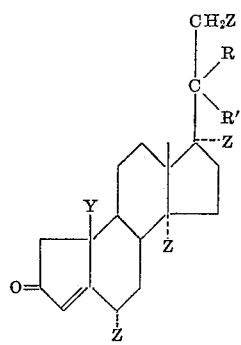

wherein R represents hydrogen, R' represents a member of the group consisting of β-hydroxy and β-acyloxy, R and R' together represent keto, Y and Z each represents a member of the group consisting of hydrogen and methyl, not more than one Z being methyl, which comprises oxidizing a compound of the formula

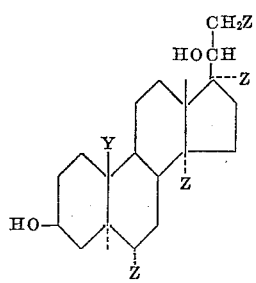

wherein Y and Z have the same meaning as above, to convert the hydroxy groups to keto groups, further oxidizing the product to obtain a compound of the formula

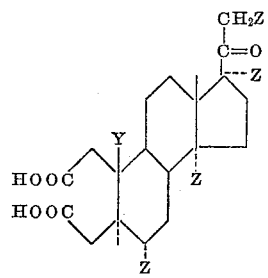

wherein Y and Z have the same meaning as above, reducing the 20-keto group to a hydroxy group, cyclizing and decarboxylating the reduced product, reacting the A-nor compound formed with a member of the group consisting of a lower alkylating agent and an acylating agent having less than 10 carbon atoms, halogenating the product, treating the halogenated compounds with an alkali metal lower alkoxide and saponifying the product with a basic agent.

2. A process for the production of A-norprogesterone which comprises oxidizing allopregnene-3β,20β-diol to allopregnene-3,20-dione, reacting the latter with an oxidizing agent to obtain 2,3-seco-allopregnane-20-one-2,3-dicarboxylic acid, reducing the last named product to 2,3-seco-allopregnane-20β-ol-2,3 - dicarboxylic acid, cyclizing and decarboxylating the last named acid to produce A-norallopregnane-2-one-20β-ol, reacting the last named product with an acylating agent to obtain A-norallo-1-pregnene-3,20β-diol-3,20β-diacetate, halogenating said diacetate to obtain A-norallopregnane-1-bromo-2-one-20β-ol 20β-acetate, reacting said acetate with an alkali metal alkoxide to obtain A-norallo-3-pregnene-2-one-20β-ol 20β-acetate, saponifying the last named compound to obtain A-nor-3-pregnene-2-one-20β-ol and oxidizing said product to obtain A-norprogesterone.

3. A process which comprises cyclizing and decarboxylating a compound of the formula

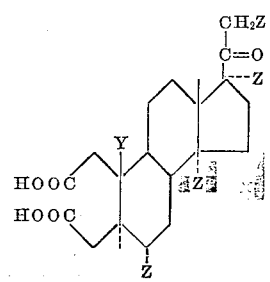

wherein Y and Z each represents a member of the group consisting of hydrogen and methyl, not more than one Z being methyl, acylating the A-norpregnane compound thus formed and halogenating the acylated product.

4. A process which comprises halogenating a compound of the formula

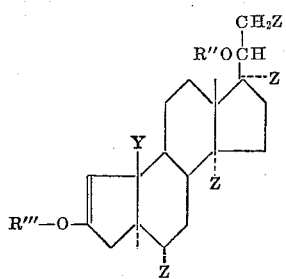

wherein R" represents the acyl radical of a fatty acid anhydride, R''' represents a member of the group consisting of fatty acid acyl and lower alkyl and Y and Z each represents a member of the group consisting of hydrogen and methyl, not more than one Z being methyl, to obtain a compound of the formula

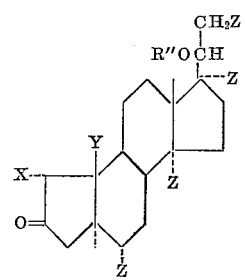

wherein R", Y and Z have the same meaning as above and X represents halogen.

5. A process for the production of A-norprogesterone which comprises reacting A-norallopregnane-1-bromo-2-one-20β-ol 20β-acetate with alkali metal alkoxide to obtain A-norallo-3-pregnene-2-one-20β-ol 20β - acetate, treating said acetate with basic agent to obtain A-nor-3-pregnene-2-one-20β-ol and oxidizing the last named product to obtain A-norprogesterone.

6. A compound of the formula

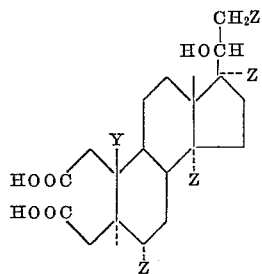

wherein Y and Z each represents a member of the group consisting of hydrogen and methyl, not more than one Z being methyl.

7. 2,3-seco-allopregnene-20β-ol-2,3-dicarboxylic acid.

8. A compound of the formula

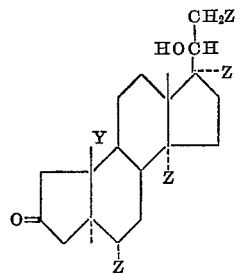

wherein Y and Z each represents a member of the group consisting of hydrogen and methyl, not more than one Z being methyl.

9. A-norallopregnane-2-one-20β-ol.

10. A compound of the formula

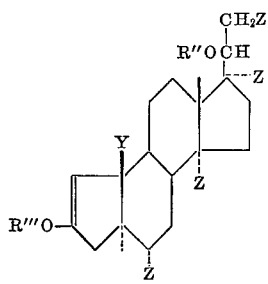

wherein R″ represents the acyl radical of a fatty acid anhydride, R‴ represents a member of the group consisting of fatty acid acyl and lower alkyl and Y and Z each represents a member of the group consisting of hydrogen and methyl, not more than one Z being methyl.

11. A-norallo-1-pregnene-3,20β-diol-3,20β-diacetate.

12. A compound of the formula

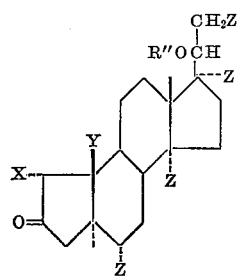

wherein R″ represents the acyl radical of a fatty acid anhydride, X represents halogen and Y and Z each represents a member of the group consisting of hydrogen and methyl, not more than one Z being methyl.

13. A-norallopregnane-1-bromo-2-one-20β-ol-20β - acetate.

No references cited.